(12) United States Patent
Neubauer et al.

(10) Patent No.: US 7,870,658 B2
(45) Date of Patent: Jan. 18, 2011

(54) METHOD FOR SHEATHING AN ARMATURE FOR ELECTRICAL MACHINES

(75) Inventors: Achim Neubauer, Sinzheim-Vormberg (DE); Pascal Chaumet, Hagenau (FR); Dirk Altmeyer, Buehl (DE); Helmut Huber, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 687 days.

(21) Appl. No.: 11/577,627

(22) PCT Filed: Aug. 25, 2005

(86) PCT No.: PCT/EP2005/054185
§ 371 (c)(1),
(2), (4) Date: Apr. 20, 2007

(87) PCT Pub. No.: WO2006/045656
PCT Pub. Date: May 4, 2006

(65) Prior Publication Data
US 2008/0048361 A1    Feb. 28, 2008

(30) Foreign Application Priority Data
Oct. 22, 2004   (DE)   ................ 10 2004 051 462

(51) Int. Cl.
*H01R 43/06*    (2006.01)
(52) U.S. Cl. .............. 29/597; 29/596; 29/598; 29/732; 264/272.2; 310/43
(58) Field of Classification Search .......... 29/596–598, 29/732–736; 310/43, 45, 71, 235, 215; 264/272.2, 264/202
See application file for complete search history.

(56) References Cited

U.S. PATENT DOCUMENTS

| | | | |
|---|---|---|---|
| 4,263,711 A | | 4/1981 | Sakano et al. |
| 5,584,114 A | * | 12/1996 | McManus .................... 29/596 |
| 5,727,307 A | * | 3/1998 | Gstohl et al. .................. 29/597 |
| 6,643,910 B2 | * | 11/2003 | Kanai et al. ................... 29/596 |
| 7,464,455 B2 | * | 12/2008 | Du et al. ........................ 29/596 |
| 7,591,063 B2 | * | 9/2009 | West ........................... 29/597 |

FOREIGN PATENT DOCUMENTS

| DE | 195 43 919 C1 | 4/1997 |
|---|---|---|
| DE | 196 10 736 A1 | 9/1997 |

* cited by examiner

*Primary Examiner*—Minh Trinh
(74) *Attorney, Agent, or Firm*—Ronald E. Greigg

(57) ABSTRACT

A method for sheathing an armature for electric machines, in which a stack of lamellae that is equipped with grooves for armature windings is mounted on an armature shaft by means of a bore and is provided with at least one groove insulation with the aid of the sheathing process. The sheathing plastic flows through ducts that extend along the bore of the stack and the armature shaft. The plastic is molded in only on a first face of the stack and flows into the grooves and through the ducts. The plastic invades the grooves also from the second face after being discharged from the ducts and converges with the plastic discharged from the first face. The method implements fixing and insulation of the grooves while the groove insulation is provided with a minimum layer thickness for such sheathings at the bottom thereof in order to allow for maximum copper fillings.

6 Claims, 1 Drawing Sheet

METHOD FOR SHEATHING AN ARMATURE FOR ELECTRICAL MACHINES

CROSS-REFERENCE TO RELATED APPLICATION

This application is a 35 USC 371 application of PCT/EP 2005/054185 filed on Aug. 25, 2005.

BACKGROUND OF THE INVENTION

1. Field of the Invention

The invention is directed to an improved method for sheathing an armature for electrical machines, in which a lamination that has slots for armature windings is slipped with a bore onto an armature shaft and provided by means of the sheathing with at least one slot insulation. The plastic flows through gates which extend along the bore of the lamination packet and along the surface of the armature shaft.

2. Description of the Prior Art

Armatures of permanent-magnet-excited small electric motors have lamination packets comprising individual laminations, or lamination packets ready for installation, which are fixed in various ways to the respective armature shafts. Besides fixation using plastic deformation (as in German Patent Disclosure DE 19933037 A), bolts (see French Patent Disclosure FR 2644947), by pressing onto knurled armature shafts, and so forth, fixation by end feeding, or sheathing, is also known. In sheathing processes by the hot-gate molding technique, with PAA6.6, minimal slot insulation wall thicknesses of 0.4 to 0.7 mm over a lamination packet length of approximately 30-40 mm are currently possible in large-scale mass production.

Furthermore, stamping packets with bores for cooling (as in Japanese Patent Disclosure JP 2000152527) or for injecting a slot insulation in the form of leadthrough gates in the injection-molding plastic are known.

The lamination geometry depends on production requirements, such as linking capability, orientation capability, and magnetic flux (see for instance JP 2003164080 or JP 2002165392).

SUMMARY AND ADVANTAGES OF THE INVENTION

The method of the invention for sheathing an armature for electrical machines has the advantage of a technical implementation of the fixation and slot insulation of the lamination packet of an armature of a small electric motor or electrical machine with optimized efficiency; the slot insulation in the slot base at the same time has a minimum layer thickness for such sheathings, in order to make maximum copper fillings possible. For this purpose, a method for sheathing an armature for electrical machines is provided, in which a lamination packet having slots for armature windings is placed with a bore onto an armature shaft and is provided by the sheathing with at least one slot insulation, and plastic flows through gates which extend along the bore of the lamination packet and along the surface of the armature shaft; the plastic is injected on only one first face end of the lamination packet, flows from this first face end into the slots and through the gates, and, once the plastic has emerged from the gates on the second face end, enters from the second face into the slots and flows together with the plastic arriving from the first face end.

Preferably, the plastic originating at the first face end flows faster through the gates than through the slots. As a result, the slots are filled quite uniformly with plastic.

The use of the plastic PAA6.6 is especially advantageous, since this plastic is especially suitable for fuel pumps.

In an advantageous refinement, the sheathing is performed by waste-free direct feeding. It is also especially advantageous if the sheathing is done by hot-gate molding.

Preferably, the size of the injection mold is adjusted relative to the spacing of the face ends of the lamination packet such that given a production-dictated maximum spacing on each face end, a plastic layer with a thickness of at least 0.2 mm is created. As a result, the tolerances in terms of length of the lamination packet can be mastered easily from a production standpoint. An average armature as a result has a markedly thicker slot insulation layer on one end than at other points of the slot insulation.

In a preferred refinement, the lamination packet is fixed on the armature shaft by the sheathing. For this purpose, depending on the required locking force of the packet on the armature shaft, the armature shaft may either be smoothed or knurled, or it may have special locking faces, such as flat faces.

With the production method according to the invention, in contrast to conventional production methods, armatures with a slot insulation thickness of 0.25 to 0.4 mm, preferably 0.3 mm, are possible. Moreover, this makes a lamination geometry of an electric motor, such as a fuel pump, possible that is suitable for producing a minimally thin slot insulation for the injection molding material used by means of waste-free sheathing using hot-gate molding and fixing the lamination packet on the armature shaft in the process.

At the same time, the lamination geometry is optimized with regard to the magnetic flux, since the yoke recesses required for the fixation and as flux aids for the slot insulation sheathing are each located beneath the respective toothed shaft; the tooth geometry is designed with a regard to maximum copper fill factors, and the yoke thickness and tooth neck width are adapted such that magnetic oversaturation occurs at no point of the lamination. For this purpose, the spacing of the gates from the respective adjacent slot bases is so great in comparison to the spacing of adjacent slots that magnetic saturation does not occur at any point of the lamination packet. Preferably, the spacing of the gates from the respective adjacent slot bases is substantially equal to the spacing of adjacent slots, so that magnetic saturation does not occur at any point of the lamination packet.

In an advantageous refinement, the sheathing extends past the face ends of the lamination packet along the armature shaft. This is advantageous if a defined edge for an ensuing full sheathing of the armature is to be produced that then makes possible sealing directly on the shaft at that location.

BRIEF DESCRIPTION OF THE DRAWINGS

Further advantages and advantageous refinements will become apparent from the description contained below, taken with the drawings, in which.

DESCRIPTION OF THE PREFERRED EMBODIMENT

Figure 1:
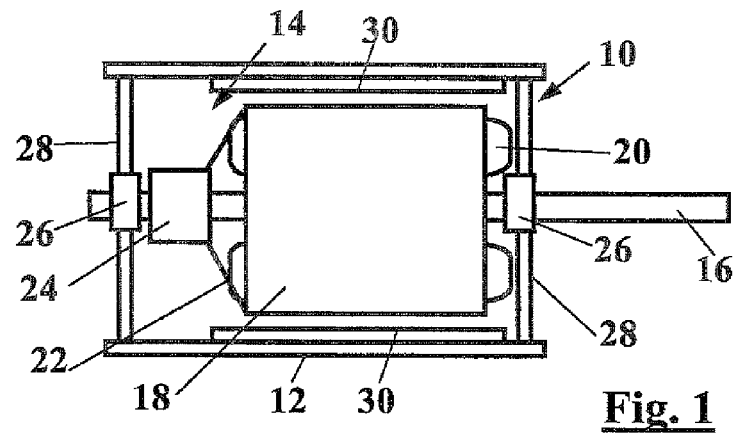
FIG. 1 shows an electrical machine embodying the invention, in longitudinal section.

In FIG. 1, part of an electrical machine 10 is shown in simplified form in longitudinal section. In the present exemplary embodiment, it is a direct current motor with brushes, also known as a commutator motor, and is part of a fuel pump of a motor vehicle. However, still other applications are possible, for instance in a fan, power window system, wiper drive mechanism, seat adjuster, or other applications in a motor vehicle. It may also be a generator, however. The electrical machine 10 preferably has only one direction of rotation and is therefore especially intended for the aforementioned fan drive mechanism. Because of its low noise, the electrical machine 10 is also extremely well suited for a fan power takeoff mechanism.

In the electrical machine 10, for the case where it is a direct current motor with brushes, a commutator is disposed on the armature shaft. If the electrical machine is a generator, this would be a slip ring.

The electrical machine 10 includes a housing, in particular a pole tube 12, and an armature 14 disposed in this tube. The armature 14 has an armature shaft 16 and a lamination packet 18 with an armature winding 20. The armature winding 20 is connected via wires 22 to hooks of a commutator 24. The wires 22 of the armature winding 20 are looped around the hooks and hot-pressed together with them. The commutator 24 is acted upon by two carbon brushes, not shown. The brushes are disposed on a brush holder, also not shown, which is made as an injection-molded plastic part. The armature shaft 16 is disposed in two bearings 26 on the face ends, and these bearings in turn are secured in two bearing caps 28. Finally, magnets 30 are disposed on the inside circumference of the pole tube 12, around the lamination packet 18.

Figure 2:
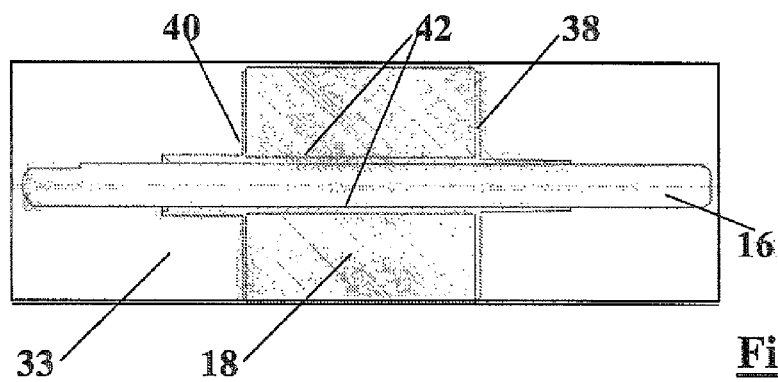
FIG. 2 shows an unwound armature in longitudinal section.
Figures 3A, 3B, 3C, 3D:
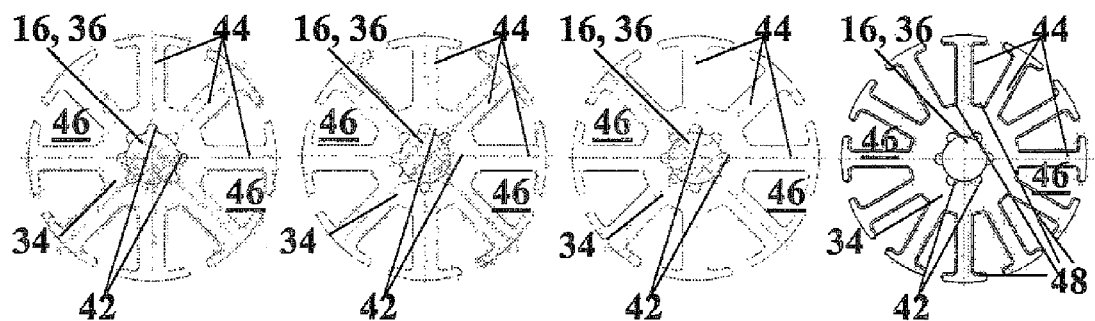
FIGS. 3a, 3b, 3c and 3d show modified armatures in cross section.

In FIGS. 2 and 3a, the armature 14 is shown in more detail, in an injection mold 33 (FIG. 2) shown schematically. The lamination packet 18 includes an annular yoke 34 with a bore 36, with which yoke the lamination packet is slipped onto the armature shaft 16. Slotlike gates 42 extend along the bore 36, from a first face end 38 to a second face end 40 of the lamination packet 18. The slotlike gates 42 may, however, alternatively or additionally extend along the outer circumference of the armature shaft 16. Protruding from the yoke 34 are radial pole teeth 44, which in pairs each define undercut slots 46. The slots 46 and the face ends 38, 40 are covered with a plastic layer, preferably PAA6.6. The thickness of the slot insulation 48 (FIG. 3d), with which at least the slots 46 are provided, amounts to 0.25 to 0.4 mm, preferably 0.3 mm, and this includes production-dictated tolerances of 0.05 mm.

The spacing of the gates 42 from the respective adjacent slot bases is so great, in comparison to the spacing of adjacent slots 46 or to the thickness of the pole teeth 44, that magnetic saturation does not occur at any point of the lamination packet 18. Preferably, the spacing of the gates 42 from the respective adjacent slot bases is essentially equal to the spacing of adjacent slots 46, or equal to the thickness of the pole teeth 44, so that magnetic saturation occurs preferably at no point of the lamination packet. The diameter of the gates 42 in the lamination cross section depends on the injection molding material employed, and in particular on its flowing capability in the injection state—LCP, for instance, is markedly less viscous than PAA6.6, but is unsuited to applications in fuels, for instance—and on the required locking force on the armature shaft 16.

The sheathing extends along the armature shaft 16 past the face ends 38, 40 of the lamination packet 18 The armature shaft 16 may be smooth (FIG. 3a), knurled (FIG. 3b), or provided with at least one flat face (FIG. 3c).

The lamination geometry with the corresponding gates 42 toward the armature shaft 16 is optimized with regard to the magnetic flux in such a way that given a statically applied magnetic field, magnetic saturation is largely avoided even in the region of the yoke. For that purpose, the gates 42 are placed in a radial extension of the center of the pole teeth 44 and are symmetrical with respect to this center. As a result of this arrangement, the region of maximum magnetic saturation in the yoke region, which moves along the outer contour on a half ellipse each from one gate 42 to the two adjacent gates 42, is minimized, since it is located in the region of maximum width of the lamination geometry near the yoke and leaves the winding space of the slots 46 open in the inner region, far toward the shaft. Moreover, the number of gates 42 is selected to be dependent on the number of teeth, such that a sufficient contact area with the armature shaft 16 remains so that, since this area in general also comprises basic iron materials, this area can participate in guiding the magnetic flux and thus overall to achieve maximum flux and minimal saturation, with maximum winding space remaining for the copper wires.

The minimal slot insulation layer, injection-molded without waste, assures a minimal loss of winding space from the necessary complete insulation and thus additionally promotes the optimization with regard to greater efficiencies. For a fuel pump drive mechanism with geometry according to the invention, which mechanism is slot insulation-sheathed with PAA6.6 by a waste-free direct feeding process, the layer thickness in large-scale mass production (more than 1 million parts per year) approximately 200 to at most 300 µm and thus is more than 50 µm less than the thicknesses known today from non-waste-free sheathings. To increase the winding space still further, the tooth neck width of the lamination can furthermore be reduced to such an extent that the flux is as high as in the regions of maximum flux above the injection gate openings in the yoke region.

In the sheathing, the armature 14 is provided by the sheathing with at least one slot insulation. The plastic is injected only in the region of one face end 38. From the face end 38, the plastic flows into the slots 46 and through the gates 42. Preferably, beginning at the first face end 38, the plastic flows faster through the gates 42 than through the slots 46. Once the plastic emerges on the second face end from the gates 42, it enters from the second face end 40 into the slots and flows together with the plastic arriving from the first face end 38. The sheathing is done by waste-free direct feeding. The sheathing is furthermore done by hot-gate molding. The lamination packet 18 is also fixed on the armature shaft 16 by the sheathing.

The size of the injection mold is adjusted, with respect to the spacing of the face ends 38, 40 of the lamination packet 18, in such a way that given a tolerance-dictated maximum spacing on each face end 38, 40, a plastic layer of at least 0.2 mm and preferably 0.3 mm is created.

As a result of the overall observation and optimization of the fixation of the lamination packet, the optimized-efficiency design of the lamination cross section, the slot insulation, and the use of waste-free direct feeding by hot-gate molding as the production method, optimizing steps are obtained which overall lead to the lamination geometries and slot insulation layer geometries described, which can be implemented in large-scale mass production by suitable direct feeding methods more economically, with high process safety and quality, than in known armature geometries and production processes.

The individual provisions according to the invention are operative above all in the totality and from the technical production aspect that the direct sheathing by hot-gate molding has substantial advantages over known alternative processes, such as powder coating methods, slipping on finished plastic caps, or hot-gate injection molding methods that involve waste, paper insulation, and so forth. For exploiting these production-related advantages, such as the elimination of postmachining steps (cutting off leftover injection molding gates, stripping, cleaning, and so forth), avoiding material waste from trimming, reduced contamination (for instance from powder), higher process safety, and so forth, and at the same time optimizing the efficiency for instance of a small electric motor operated in the presence of fuel (or fluids), with a minimal rotor diameter (for instance to keep hydraulic losses, which rise sharply with the rpm, low) and a minimal armature length (for instance to achieve minimal installation heights for fuel pump modules), what was required was the combination according to the invention of geometric optimizations of the lamination cross sections, the use of the shaft material for conducting flux as well, and a minimal slot insulation layer thickness, above all in the voids between the teeth, so as to generate maximum possible winding spaces for the copper wires. The size of the winding space makes it possible for the first time to fully utilize the possible flux and thus to optimally utilize the electrical energy through the wires for the magnetically induced rotation of the armature and to fully utilize the efficiency of the motor, while at the same time optimizing the cost for production technology with regard to the fixation of the lamination packet on the armature shaft, with regard to the slot insulation, with regard to tolerances in the packet length, and with regard to avoiding waste, as well as assuring cleanliness and process safety.

The foregoing relates to a preferred exemplary embodiment of the invention, it being understood that other variants and embodiments thereof are possible within the spirit and scope of the invention, the latter being defined by the appended claims.

The invention claimed is:

1. A method for sheathing an armature for electrical machines in which a lamination packet is attached to an armature shaft, said armature shaft having an outer circumference, said lamination packet having a first face end and a second face end, slots for armature windings, a bore, and a plurality of slotlike gates which extend along either the bore or the outer circumference of the armature shaft from said first face end to said second face end, the method comprising the steps of:
injecting insulating plastic on only said first face end of the lamination packet,
flowing the plastic from said first face end into the slots and the plurality of gates such that the plastic flows toward the second face end, wherein the plastic originating at the first face end flows faster through the gates than through the slots,
allowing the flowing plastic to emerge from the plurality of gates on the second face end, and
causing the plastic flowing from the plurality of gates on the second face end to enter the slots from said second face end and flow together with the plastic flowing from said first face end,
said method resulting in said lamination packet being provided with at least one slot insulation.

2. The method as defined by claim 1, wherein PAA6.6 is used as the plastic.

3. The method as defined by claim 2, wherein the sheathing is performed by waste-free direct feeding and/or by a hot-gate molding technique.

4. The method as defined by claim 1, wherein the sheathing is performed by waste-free direct feeding and/or by a hot-gate molding technique.

5. The method as defined by claim 1, wherein the molding is performed using an injection mold and a size of the injection mold is adjusted relative to spacing of the face ends of the lamination packet such that given a production-dictated maximum spacing on each face end, a plastic layer with a thickness of at least 0.2 mm is created.

6. The method as defined by claim 1, wherein the lamination packet is fixed on the armature shaft by the sheathing.

* * * * *